United States Patent
McMahon et al.

(10) Patent No.: US 10,436,063 B2
(45) Date of Patent: Oct. 8, 2019

(54) ASSEMBLY FOR MOUNTING A TURBINE ENGINE TO AN AIRFRAME

(75) Inventors: Shawn M. McMahon, Agawam, MA (US); Kirk A. Shute, New Britain, CT (US); Jeffrey R. Lavin, Bloomfield, CT (US); Russell P. Parrish, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 1001 days.

(21) Appl. No.: 13/588,384

(22) Filed: Aug. 17, 2012

(65) Prior Publication Data

US 2014/0047850 A1 Feb. 20, 2014

(51) Int. Cl.
| | |
|---|---|
| *F02C 7/20* | (2006.01) |
| *F01D 25/16* | (2006.01) |
| *F02K 1/80* | (2006.01) |
| *B64D 27/26* | (2006.01) |

(52) U.S. Cl.
CPC ............ *F01D 25/16* (2013.01); *B64D 27/26* (2013.01); *F02C 7/20* (2013.01); *F02K 1/80* (2013.01); *B64D 2027/268* (2013.01)

(58) Field of Classification Search
CPC ... F02C 7/20; F23R 3/60; B64D 27/26; B64D 2027/262; B64D 2027/264; B64D 2027/266; B64D 2027/268; B64D 27/00; B64D 27/10; B64D 27/12; B64D 27/14
USPC ............... 60/796–799; 244/54; 248/554–557
See application file for complete search history.

(56) References Cited

U.S. PATENT DOCUMENTS

| | | | |
|---|---|---|---|
| 5,746,391 A * | 5/1998 | Rodgers ................. | B64D 27/18 244/54 |
| 6,708,925 B2 | 3/2004 | Udall | |
| 7,093,996 B2 | 8/2006 | Wallace et al. | |
| 7,631,481 B2 | 12/2009 | Cowan et al. | |
| 7,739,872 B2 | 6/2010 | Murphy et al. | |
| 8,118,251 B2 | 2/2012 | Suciu et al. | |
| 8,127,526 B2 | 3/2012 | Murphy et al. | |
| 8,201,413 B2 | 6/2012 | Lavin et al. | |
| 8,205,430 B2 | 6/2012 | Jain | |
| 2003/0025033 A1* | 2/2003 | Levert .................... | B64D 27/26 244/54 |
| 2005/0194493 A1* | 9/2005 | Marche ................. | B64D 27/26 244/54 |
| 2009/0140497 A1* | 6/2009 | Roberts et al. ............... | 277/636 |
| 2010/0050646 A1 | 3/2010 | Lovett et al. | |
| 2012/0012694 A1* | 1/2012 | West ............................. | 244/54 |

FOREIGN PATENT DOCUMENTS

GB        2010969 A * 7/1979

* cited by examiner

*Primary Examiner* — Ehud Gartenberg
*Assistant Examiner* — Thomas P Burke
(74) *Attorney, Agent, or Firm* — O'Shea Getz P.C.

(57) ABSTRACT

An assembly is provided for mounting a turbine engine to an airframe. The turbine engine extends along an axial centerline and includes an engine core mount and an engine exhaust mount. The assembly includes a thrust pin linkage connecting and extending axially between a core thrust pin and an exhaust thrust pin. The core thrust pin is adapted to connect to the engine core mount, and the exhaust thrust pin is adapted to connect to the engine exhaust mount. One of the core thrust pin, the exhaust thrust pin and the thrust pin linkage is also adapted to connect to the airframe.

5 Claims, 5 Drawing Sheets

ASSEMBLY FOR MOUNTING A TURBINE ENGINE TO AN AIRFRAME

BACKGROUND OF THE INVENTION

1. Technical Field

The present invention relates generally to a turbine engine and, more particularly, to an assembly for mounting a turbine engine to an aircraft airframe.

2. Background Information

A turbine engine may include an annular flexible seal extending axially between an engine core and an engine exhaust. The flexible seal may accommodate axial, transverse and/or angular shifting between the core and the exhaust without significant axial and/or radial load transfer therebetween. Such shifts between the core and the exhaust may occur during certain operating conditions such as high impact landings, severe turbulence, etc. To maintain this structural independence, the core and the exhaust are typically separately mounted to an aircraft airframe respectively using a core thrust pin and an exhaust thrust pin. The core thrust pin connects and extends radially between the core and the airframe. The exhaust thrust pin connects and extends radially between the exhaust and the airframe.

During turbine engine operation, the core subjects the core thrust pin and the connected airframe to an axial core thrust load in a first axial direction. The core may also subject the exhaust to a portion of this thrust load due to, for example, drag against inner walls of the exhaust and/or against a variable flow exhaust nozzle at an aft end of the exhaust. The exhaust therefore may subject the exhaust thrust pin and the connected airframe to an axial drag thrust load in a second axial direction that is opposite the first axial direction. Subjecting the airframe to both of these opposing axial thrust loads may significantly increase internal stresses within the airframe, which may require airframe over-engineering and increased airframe weight.

SUMMARY OF THE DISCLOSURE

According to an aspect of the present disclosure, an assembly is provided for mounting a turbine engine to an airframe. The turbine engine extends along an axial centerline, and includes an engine core mount and an engine exhaust mount. The assembly includes a thrust pin linkage connecting and extending axially between a core thrust pin and an exhaust thrust pin. The core thrust pin is connected to the engine core mount. The thrust pin is connected to the engine exhaust mount. One of the core thrust pin, the exhaust thrust pin and the thrust pin linkage is connected to the airframe. The assembly may also include a bearing to pivotally connect an end of the core thrust pin to the engine core mount, and/or a bearing to pivotally connect an end of the exhaust thrust pin to the engine exhaust mount.

According to another aspect of the present disclosure, an assembly is provided for mounting a turbine engine to an airframe. The turbine engine extends along an axial centerline, and includes a flexible seal that extends axially between an engine core and an engine exhaust. The core includes an engine core mount, and the exhaust includes an engine exhaust mount. The assembly includes a thrust pin linkage connecting and extending axially between a core thrust pin and an exhaust thrust pin. The core thrust pin is at least one of pivotally and radially slidably connected to the engine core mount. The exhaust thrust pin is at least one of pivotally and radially slidably connected to the engine exhaust mount. One of the core thrust pin, the exhaust thrust pin and the thrust pin linkage is connected to the airframe.

According to still another aspect of the present disclosure, a turbine engine is provided from mounting to an airframe. The turbine engine extends along an axial centerline and includes a turbine engine core, a turbine engine exhaust, a core thrust pin, an exhaust thrust pin, and a thrust pin linkage. The core includes an engine core mount connected to a core case. The exhaust includes an engine exhaust mount connected to an exhaust case. The core thrust pin is at least one of pivotally and radially slidably connected to the engine core mount. The exhaust thrust pin is at least one of pivotally and radially slidably connected to the engine exhaust mount. The thrust pin linkage connects and extends axially between the core thrust pin and the exhaust thrust pin. One of the core thrust pin, the exhaust thrust pin and the thrust pin linkage is connected to the airframe. The turbine engine may also include an annular flexible seal that extends axially between the core case and the exhaust case.

A bearing may be included to pivotally connect an end of the thrust pin linkage to the core thrust pin. A bearing may also or alternatively be included to pivotally connect another end of the thrust pin linkage to the exhaust thrust pin.

The core thrust pin may include and extend radially between a first core thrust pin end and a second core thrust pin end. The first core thrust pin end may be radially slidably connected to the engine core mount. The exhaust thrust pin may include and extend radially between a first exhaust thrust pin end and a second exhaust thrust pin end. The first exhaust thrust pin end may be radially slidably connected to the engine exhaust mount. In some embodiments, the second core thrust pin end may be connected to the airframe. In other embodiments, the second exhaust thrust pin end may be connected to the airframe. In still other embodiments, the thrust pin linkage may be connected to the airframe. The thrust pin linkage may include, for example, a linkage base segment and a linkage thrust pin segment. The linkage base segment may include and extend axially between a first linkage end that is connected to the second core thrust pin end, and a second linkage end that is connected to the second exhaust thrust pin end. The linkage thrust pin segment may extend radially from the linkage base segment to a distal thrust pin segment end that is connected to the airframe.

The thrust pin linkage may include and extend axially between a first linkage end that is connected to the core thrust pin radially between the first and the second core thrust pin ends, and a second linkage end that is connected to the second exhaust thrust pin end. Alternatively, the thrust pin linkage may include and extend axially between a first linkage end that is connected to the second core thrust pin end, and a second linkage end that is connected to the exhaust thrust pin radially between the first and the second exhaust thrust pin ends.

The foregoing features and the operation of the invention will become more apparent in light of the following description and the accompanying drawings.

DETAILED DESCRIPTION OF THE INVENTION

Figure 1:
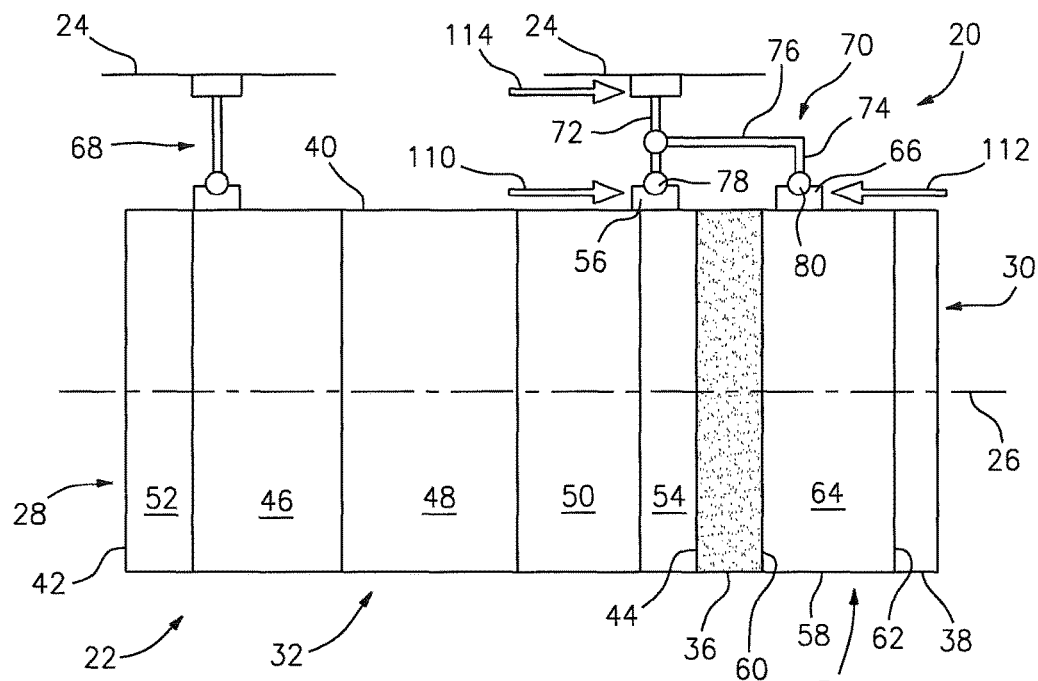
FIG. 1 is a side view illustration of an assembly for mounting a turbine engine to an airframe.
Figure 2:
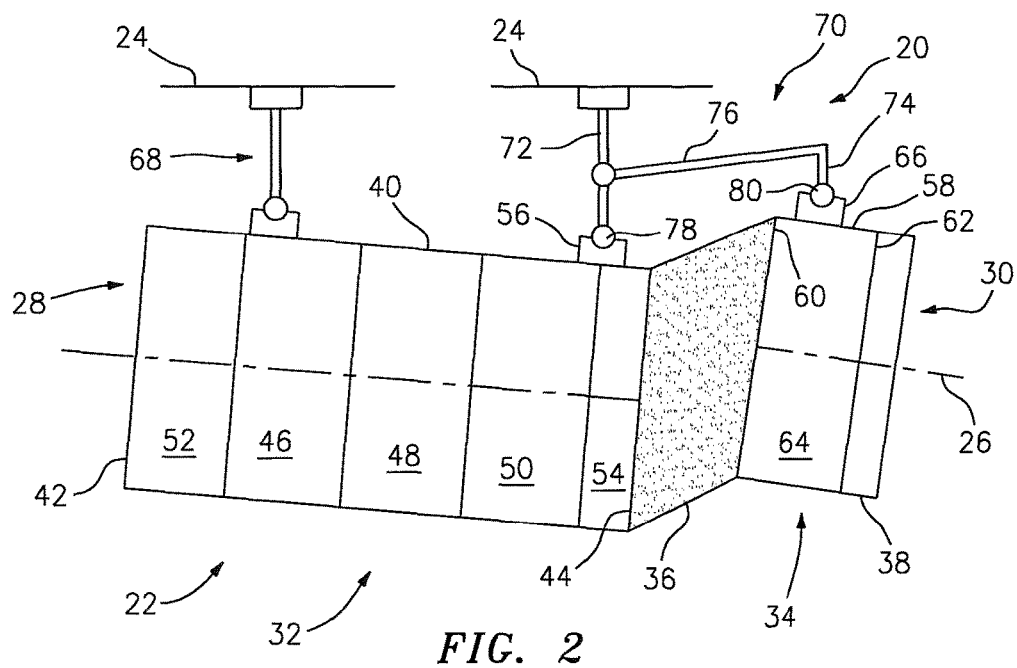
FIG. 2 is a side view illustration of the mounting assembly, the turbine engine and the airframe of FIG. 1 during another mode of operation.

FIGS. 1 and 2 illustrate a mounting apparatus 20 for mounting a turbine engine 22 to an aircraft airframe 24 such as, for example, an aircraft fuselage, an aircraft wing, etc. The turbine engine 22 extends along an axial centerline 26 between a forward airflow inlet 28 and an aft airflow exhaust outlet 30. The turbine engine 22 includes a turbine engine core 32, a turbine engine exhaust 34 and a flexible seal 36. The turbine engine 22 may also include a variable flow exhaust nozzle 38 that defines the aft airflow exhaust outlet 30.

The core 32 includes a core case 40 that extends axially between a core case forward end 42, which may be located at (e.g., proximate or adjacent) the forward airflow inlet 28, and a core case aft end 44. The core case 40 may house a compressor section 46, a combustor section 48 and/or a turbine section 50, which are sequentially arranged along the axial centerline 26. The core case 40 may also (or alternatively) house a fan section 52 and/or an augmentor section 54. The fan section 52 is arranged axially between the forward core case end 42 and the compressor section 46. The augmentor section 54 is arranged axially between the turbine section 50 and the core case aft end 44. The core case 40 includes an engine core mount 56 that may be located at the core case aft end 44.

The exhaust 34 includes an exhaust case 58 that extends axially between a forward exhaust case end 60 and an aft exhaust case end 62, which may be connected to the exhaust nozzle 38. The exhaust case 58 may house or be configured as an exhaust duct 64. The exhaust case 58 includes an engine exhaust mount 66 that may be located at the forward exhaust case end 60.

The flexible seal 36 is connected to and extends axially between the core case aft end 44 and the exhaust case forward end 60. The flexible seal 36 may accommodate shifts (e.g., axial, transverse and/or angular shifts) between the core case 40 and the exhaust case 58, for example, without significant axial and/or radial load transfer between the engine cases 40 and 58. Such shifts between the core case 40 and the exhaust case 58 may occur during certain operating conditions such as, for example, high impact landings, severe turbulence, etc.

The mounting apparatus 20 includes one or more assemblies such as, for example, at least one first mounting assembly 68 and at least one second (e.g., thrust transfer) mounting assembly 70. The first mounting assembly 68 mounts, for example, a forward region of the core case 40 to the airframe 24. The second mounting assembly 70 mounts, for example, an aft region of the core case 40 as well as a forward region of the exhaust case 58 to the airframe 24. The second mounting assembly 70 includes a turbine engine core thrust pin 72, a turbine engine exhaust thrust pin 74, and a thrust pin linkage 76. The second mounting assembly 70 may also include a first bearing 78 (e.g., a cylindrical bearing) and/or a second bearing 80 (e.g., a cylindrical bearing).

Figure 3:
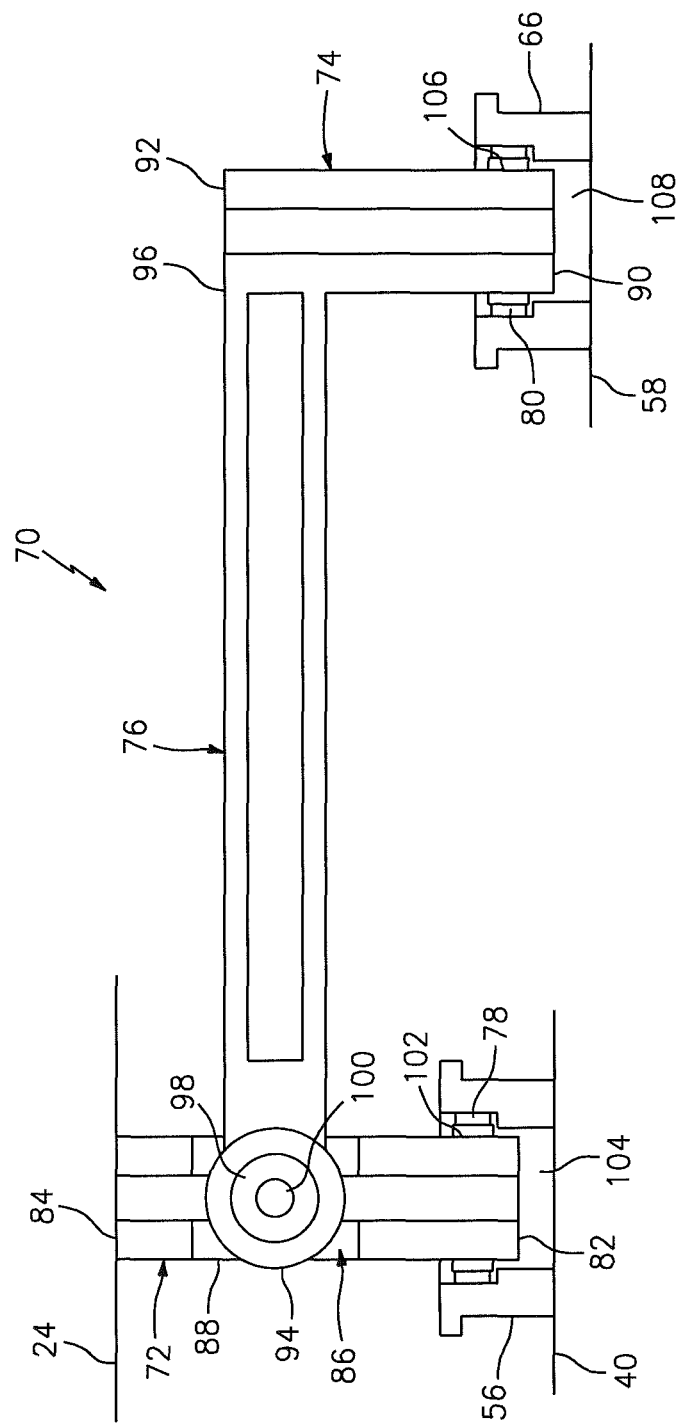
FIG. 3 is a side-sectional illustration of the mounting assembly of FIG. 1.
Figure 4:
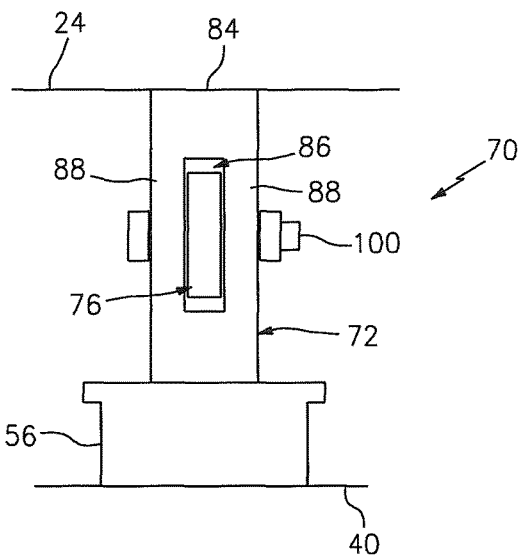
FIG. 4 is a forward view illustration of the mounting assembly of FIG. 1.

Referring to FIGS. 3 and 4, the core thrust pin 72 may be configured as a tubular body (e.g., a length of cylindrical tube). The core thrust pin 72 extends radially between a first (e.g., radial inner) core thrust pin end 82 and a second (e.g., radial outer) core thrust pin end 84. The core thrust pin 72 embodiment of FIGS. 3 and 4 includes a linkage mounting aperture 86, which may be radially located (e.g., centrally) between the first and the second core thrust pin ends 82 and 84. The linkage mounting aperture 86 extends axially through the core thrust pin 72, and laterally (e.g., circumferentially) between opposing core thrust pin side segments 88.

Referring to FIG. 3, the exhaust thrust pin 74 may be configured as a tubular body (e.g., a length of cylindrical tube). The exhaust thrust pin 74 extends radially between a first (e.g., radial inner) exhaust thrust pin end 90 and a second (e.g., radial outer) exhaust thrust pin end 92.

The thrust pin linkage 76 extends axially between a first (e.g., forward) linkage end 94 and a second (e.g., aft) linkage end 96. The thrust pin linkage 76 embodiment of FIGS. 3 and 4 includes a bearing 98 (e.g., a Heim joint spherical bearing) located at the first linkage end 94. The bearing 98 is arranged within the linkage mounting aperture 86 and connects to the core thrust pin 72 with a fastener 100 (e.g., a bolt and nut). The first linkage end 94 therefore is pivotally connected to the core thrust pin 72. The second linkage end 96 is fixedly connected (e.g., welded, adhered or mechanically fastened) to the exhaust thrust pin 74 at, for example, the second exhaust thrust pin end 92. In this manner, the thrust pin linkage 76 structurally links the core thrust pin 72 and the exhaust thrust pin 74 together.

Referring to FIG. 3, the first core thrust pin end 82 may be pivotally and/or slidably connected to the engine core mount 56. The first core thrust pin end 82, for example, is radially slidably mated with a pin aperture 102 of the first bearing 78. The first bearing 78 is (e.g., fixedly) seated within an inner bore 104 of the engine core mount 56. The second core thrust pin end 84 is fixedly connected (e.g., welded, adhered or mechanically fastened) to the airframe 24. The first exhaust thrust pin end 90 may be pivotally and/or slidably connected to the engine exhaust mount 66. The first exhaust thrust pin end 90, for example, is radially slidably mated with a pin aperture 106 of the second bearing 80. The second bearing 80 is (e.g., fixedly) seated within an inner bore 108 of the engine exhaust mount 66.

During operation of the turbine engine 22 of FIG. 1, the engine core 32 subjects the core thrust pin 72 to a relatively large axial core thrust load 110 in a first axial direction. The engine core 32 may also subject the exhaust 34 to a portion of the thrust load due to, for example, drag against inner walls of the exhaust duct 64 and/or against the convergent components of the exhaust nozzle 38. The exhaust 34 therefore may subject the exhaust thrust pin 74, the thrust pin linkage 76 and the core thrust pin 72 to an axial drag thrust load 112 in a second axial direct that is opposite the first axial direction. The core thrust pin 72 provides a load buffer between the core and exhaust 32 and 34 and the airframe 24 such that, for example, the airframe 24 is subject to an overall (combined) thrust load 114 in the first axial direction. In this manner, the second mounting assembly 70 may reduce internal stresses within the airframe 24 as compared to prior art mounting assemblies, while also permitting shifting between the core case 40 and the exhaust case 58 as illustrated in FIG. 2.

Figure 5:
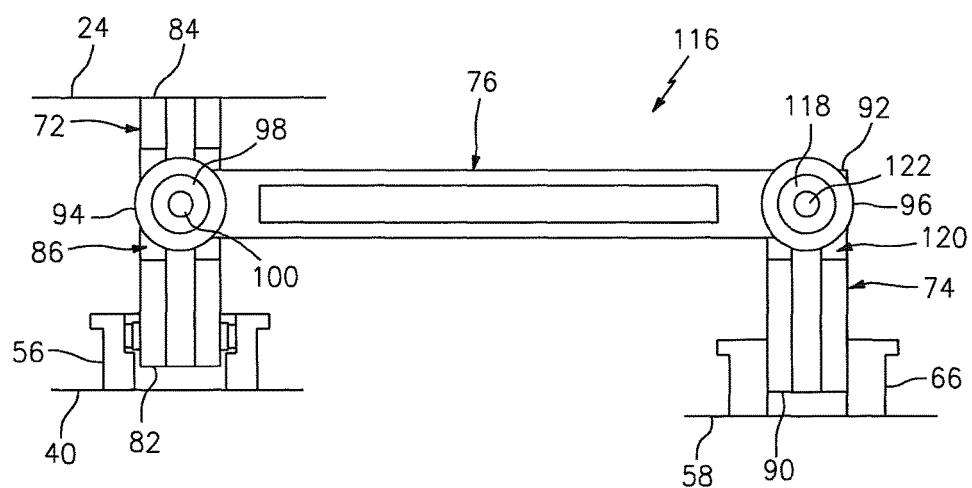
FIG. 5 is a side-sectional illustration of another assembly for mounting the turbine engine to the airframe.

FIG. 5 illustrates another second mounting assembly 116 for mounting the turbine engine 22 to the airframe 24. In contrast to the second mounting assembly 70 illustrated in FIG. 3, the thrust pin linkage 76 includes another bearing 118 (e.g., a Heim joint spherical bearing) located at the second linkage end 96. This bearing 118 is arranged within a linkage mounting aperture 120 extending through the exhaust thrust pin 74 at, for example, the second exhaust thrust pin end 92. The bearing 118 is connected to the exhaust thrust pin 74 with a fastener 122 (e.g., a bolt and nut). The second linkage end 96 embodiment of FIG. 5 therefore is pivotally connected to the core thrust pin 72. The first linkage end 90 is fixedly connected (e.g., welded, adhered or mechanically fastened) to the exhaust thrust mount 66.

Figure 6:
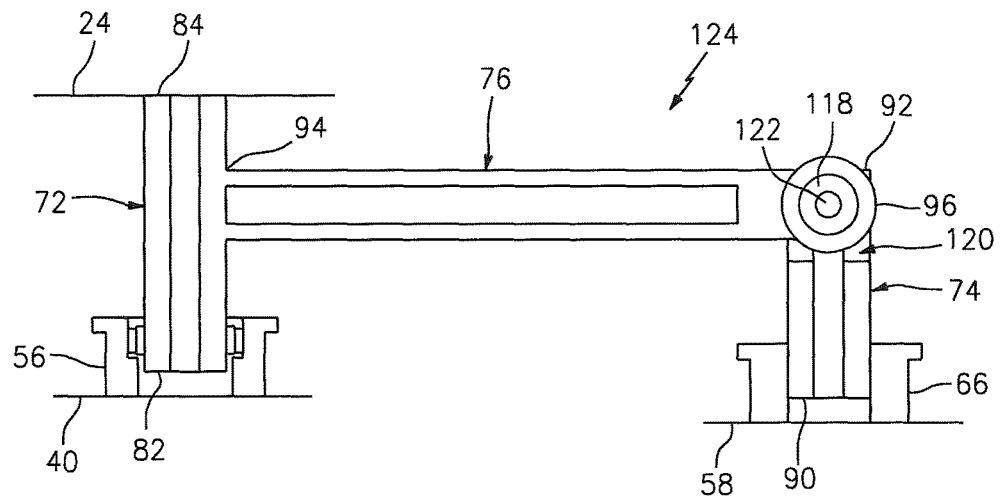
FIG. 6 is a side-sectional illustration of another assembly for mounting the turbine engine to the airframe.

FIG. 6 illustrates a second embodiment of a second mounting assembly 124 for mounting the turbine engine 22 to the airframe 24. In contrast to the second mounting assembly 116 illustrated in FIG. 5, the first linkage end 94 is fixedly connected (e.g., welded, adhered, or mechanically fastened) to the exhaust thrust pin 74.

Figure 7:
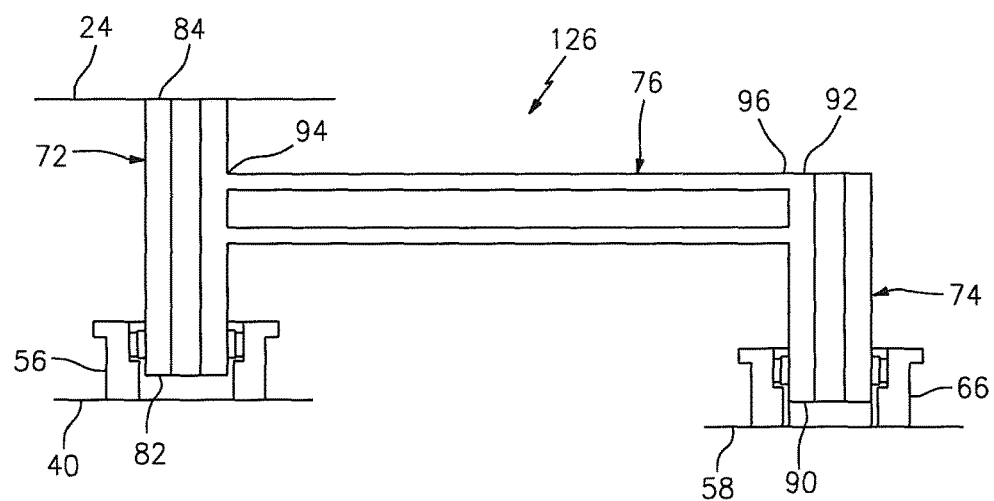
FIG. 7 is a side-sectional illustration of another assembly for mounting the turbine engine to the airframe.

FIG. 7 illustrates a third embodiment of a second mounting assembly 126 for mounting the turbine engine 22 to the airframe 24. In contrast to the second mounting assembly 70 illustrated in FIG. 3, the first linkage end 94 is fixedly connected (e.g., welded, adhered, or mechanically fastened) to the core thrust pin 72.

Figure 8:
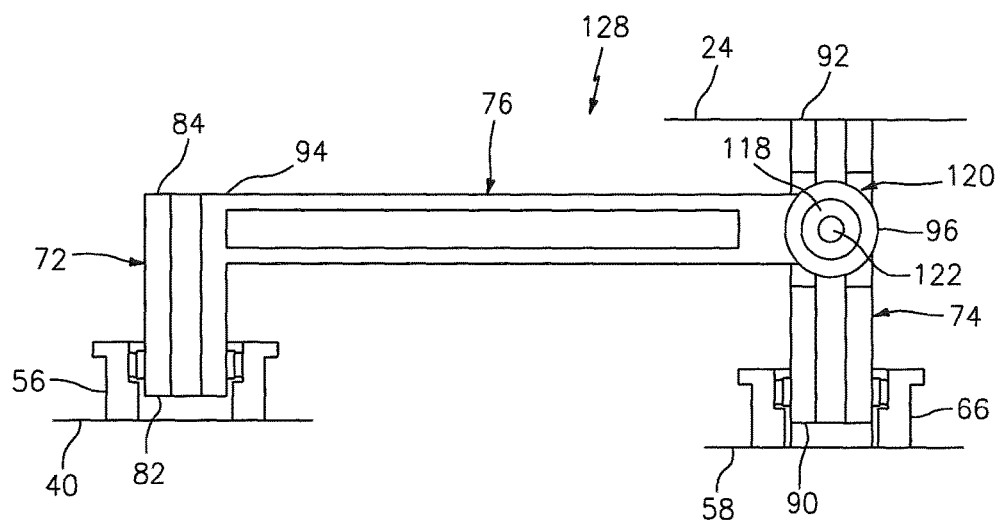
FIG. 8 is a side-sectional illustration of another assembly for mounting the turbine engine to the airframe.

FIG. 8 illustrates a fourth embodiment of a second mounting assembly 128 for mounting the turbine engine 22 to the airframe 24. In contrast to the second mounting assembly 124 illustrated in FIG. 6, the first linkage end 94 is fixedly connected to the core thrust pin 72 at, for example, the second core thrust pin end 84. The second linkage end 96 is pivotally connected to the exhaust thrust pin 74 radially between the first and the second exhaust thrust pin ends 90 and 92. In addition, the second exhaust thrust pin end 92 is fixedly connected (e.g., welded, adhered, or mechanically fastened) to the airframe 24 instead of the second core thrust pin end 84 as illustrated in FIG. 6.

Figure 9:
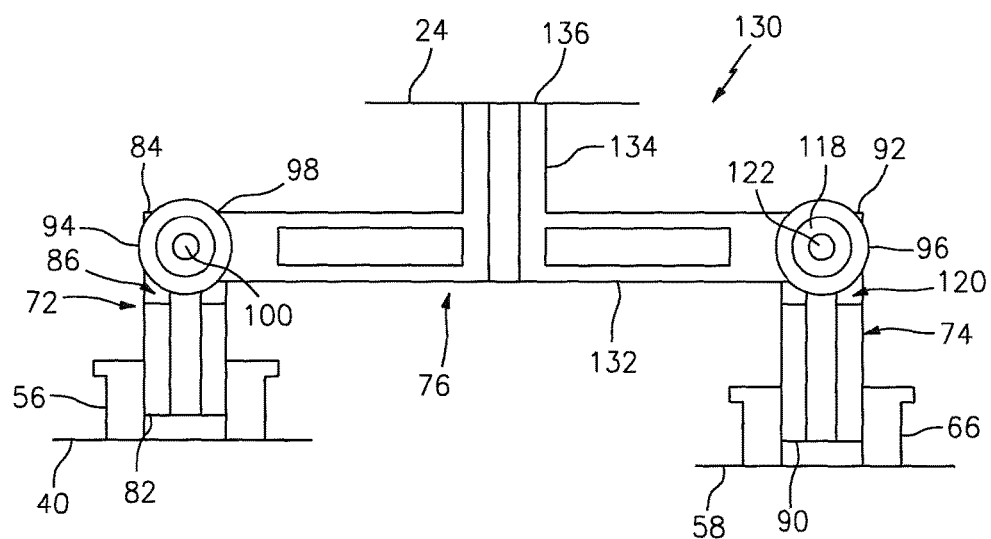
FIG. 9 is a side-sectional illustration of still another assembly for mounting the turbine engine to the airframe.

FIG. 9 illustrates a fifth embodiment of a second mounting assembly 130 for mounting the turbine engine 22 to the airframe 24. In contrast to the second mounting assembly 116 illustrated in FIG. 5, the thrust pin linkage 76 of the second mounting assembly 130 includes a linkage base segment 132 and a linkage thrust pin segment 134. The base segment 132 extends axially between the first linkage end 94 and the second linkage end 96. The first linkage end 94 is pivotally connected to the core thrust pin 72 at, for example, the second core thrust pin end 84. The second linkage end 96 is pivotally connected to the exhaust thrust pin 74 at, for example, the second exhaust thrust pin end 92. The thrust pin segment 134 extends radially out from the base segment 132 to a distal thrust pin segment end 136 that is fixedly connected (e.g., welded, adhered, or mechanically fastened) to the airframe 24 instead of the second core thrust pin end 84 as illustrated in FIG. 5 or the second exhaust thrust pin end 92 as illustrated in FIG. 8.

A person of skill in the art will recognize that the core thrust pin 72, the exhaust thrust pin 74 and the thrust pin linkage 76 may be pivotally and/or fixedly interconnected in various manners other than those described above and/or illustrated in the drawings. A person of skill in the art will also recognize that the core thrust pin 72 and/or the exhaust thrust pin 74 may be respectively connected to the engine core mount 56 and/or the engine exhaust mount 66 in various manners other than those described above and/or illustrated in the drawings. The present invention therefore is not limited to any particular type of fixed and/or movable (e.g., slidable, pivotable, etc.) connections between the second mounting assembly components and/or between the second mounting assembly and the turbine engine and/or the airframe.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine for mounting to an airframe, the turbine engine extending along an axial centerline and comprising:
    a turbine engine core having an engine core mount connected to a core case;
    a turbine engine exhaust having an engine exhaust mount connected to an exhaust case;
    a core thrust pin partially projecting radially into an inner bore of the engine core mount after complete assembly of the core thrust pin with the engine core mount, wherein a length of the inner bore of the engine core mount is greater than a corresponding length that the core thrust pin partially projects radially into the inner bore of the engine core mount;
    an exhaust thrust pin partially projecting radially into an inner bore of the engine exhaust mount after complete assembly of the exhaust thrust pin with the engine exhaust mount, wherein a first exhaust thrust pin end of the exhaust thrust pin is at least one of pivotally and radially slidably connected to the engine exhaust mount, and wherein a length of the inner bore of the engine exhaust mount is greater than a corresponding length that the exhaust thrust pin partially projects radially into the inner bore of the engine exhaust mount;
    a thrust pin linkage connecting and extending axially between the core thrust pin and the exhaust thrust pin; and
    wherein one of the core thrust pin, the exhaust thrust pin and the thrust pin linkage is adapted to connect to the airframe.

2. The turbine engine of claim 1, further comprising a flexible seal that extends axially between the core case and the exhaust case.

3. The turbine engine of claim 1, wherein
    the core thrust pin includes a first core thrust pin end that is connected to the engine core mount, and a second core thrust pin end that is adapted to connect to the airframe;
    the exhaust thrust pin includes the first exhaust thrust pin end that is connected to the engine exhaust mount, and a second exhaust thrust pin end; and
    the thrust pin linkage includes a first linkage end that is connected to the core thrust pin radially between the first core thrust pin end and the second core thrust pin end, and a second linkage end that is connected to the second exhaust thrust pin end.

4. The turbine engine of claim 3, wherein at least one of the first linkage end is pivotally connected to the core thrust pin, and the second linkage end is pivotally connected to the second exhaust thrust pin end.

5. The turbine engine of claim 1, wherein
- the core thrust pin includes a first core thrust pin end that is connected to the engine core mount, and a second core thrust pin end;
- the exhaust thrust pin includes the first exhaust thrust pin end that is connected to the engine exhaust mount, and a second exhaust thrust pin end that is adapted to connect to the airframe;
- the thrust pin linkage includes a first linkage end that is connected to the second core thrust pin end, and a second linkage end that is connected to the exhaust thrust pin radially between the first and the second exhaust thrust pin ends; and
- at least one of the first linkage end is pivotally connected to the second core thrust pin end, and the second linkage end is pivotally connected to the exhaust thrust pin.

\* \* \* \* \*